(No Model.)
L. G. FERRAIOLI.
CAKE AND CONFECTIONERY MACHINE.
No. 467,003. Patented Jan. 12, 1892.
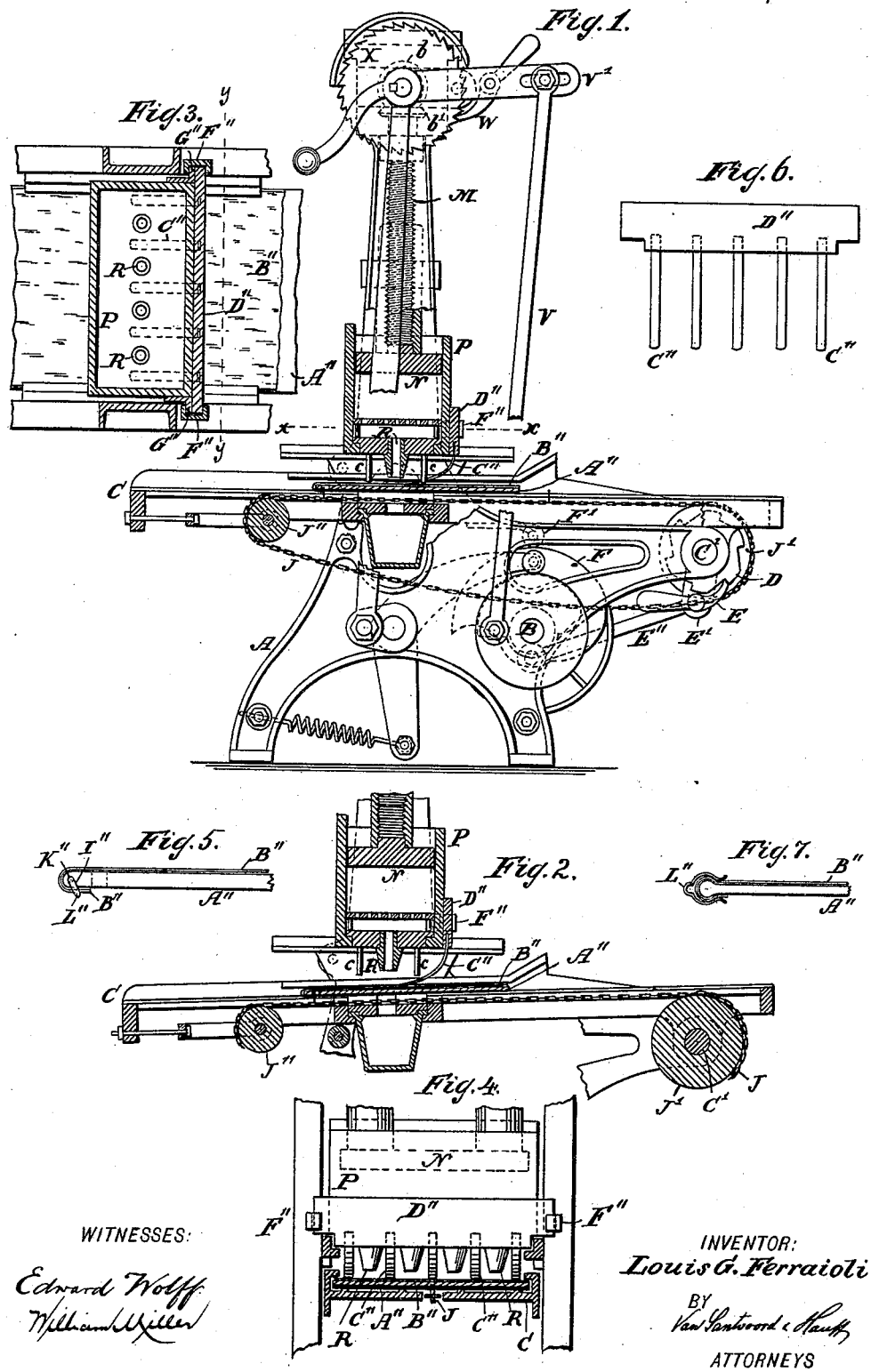
WITNESSES:
Edward Wolff
William M. Miller
INVENTOR:
Louis G. Ferraioli.
BY
Van Santvoord & Hauff
ATTORNEYS

UNITED STATES PATENT OFFICE.

LOUIS G. FERRAIOLI, OF NEW YORK, N. Y., ASSIGNOR OF ONE-HALF TO WILLIAM A. CAMERON, OF SAME PLACE.

CAKE AND CONFECTIONERY MACHINE.

SPECIFICATION forming part of Letters Patent No. 467,003, dated January 12, 1892.

Application filed May 21, 1891. Serial No. 393,589. (No model.)

*To all whom it may concern:*

Be it known that I, LOUIS G. FERRAIOLI, a subject of the King of Italy, residing at New York, in the county and State of New York, have invented new and useful Improvements in Cake and Confectionery Machines, of which the following is a specification.

This invention relates to an improvement in cake and confectionery machines; and the invention consists in the details of construction set forth in the following specification and claims and illustrated in the annexed drawings, in which—

Figure 1 is a sectional side elevation of a machine containing my invention. Fig. 2 is a view similar to Fig. 1 with parts in a different position than in Fig. 1. Fig. 3 is a section along $xx$, Fig. 1. Fig. 4 is a section along $yy$, Fig. 3. Fig. 5 is a detail side view of a pan. Fig. 6 is a detail view of spring arms or pressers. Fig. 7 is another detail side view of a pan with a modified form of paper-holder.

This invention is shown applied to a cake or confectionery machine of the kind illustrated in United States Letters Patent No. 291,381, of January 1, 1884; but of course I do not limit myself to this precise machine in using my invention.

In the drawings, the letter A indicates a frame or support, and B is a driving-shaft. The swinging table C is mounted on shaft C', having a ratchet D, operated by the pawl E on arm E', which receives motion from rod E'', so that a step-by-step motion is given to the chain or conveyer J, extending over pulleys J' J''. The cam F acts on roller F', so as to rock or swing the table C. The link V actuates the arm V', pawl W, and ratchet X, so as to turn the bevel-gears $b\ b'$ and cause the screws M to force the piston N into the dough or material box P and eject a proper supply of material through the nozzles R onto the pan A''. The stops $c$ prevent the pan being forced into contact with the nozzles. These parts being of well-known operation need no detailed description here.

In baking or manufacturing delicate confectionery it is necessary that the dough or material, instead of being dropped directly onto pan A'', be dropped onto a sheet of paper B''. Difficulty, however, was experienced from the fact that the paper would be lifted or somewhat raised from the pan on the descent of the table C, thus tending to spoil the regularity of the work. To overcome this difficulty I provide spring-pressers C'', which press upon the paper B'' to keep the latter continually flat on the pan.

The spring-pressers C'' are readily made from strips of suitable springy material—such as metal, whalebone, or the like—secured to a suitable base or board D''. The base or board D'' is clamped or secured to the dough-box P, and the pressers C'' extend under the box between the nozzles R, so as to hold the paper B'' flat to the pan. As the pressers C'' are elastic, they readily yield as the pan rises and falls without relinquishing their pressure on the paper.

The base D'' is readily secured in place by clamps or hooks F'', which catch the edges of the base D'' and the projecting lips or flanges G'' of the dough-box. By removing the clamps F'' the base or board D'', with its pressers C'', can be taken off when not required—as, for example, in baking coarser goods.

To keep the front edge of the paper firmly in place, I provide the pan with a paper holder or clamp, Fig. 5. The paper holder or clamp shown in the drawings consists of a rod L'', secured to arms I'', pivoted or jointed at K'' to each side of the pan A''. By lapping or folding the edge of the paper B'' under the pan and swinging the rod L'' against the bottom of the pan the edge of the paper is held or clamped against displacement. In place of a paper holder or clamp composed of a rod L'' to hold the edge of the paper, any other suitable fastening—as, for example, a spring-clamp L'', Fig. 7—can be employed.

What I claim as new, and desire to secure by Letters Patent, is—

1. The combination, with a box having an ejecting-nozzle, a pan-supporting table, and a pan, of a presser supported above the pan and extending under the box to press a sheet of paper upon the pan, substantially as described.

2. The combination, with a box having an ejecting-nozzle, of a movable table, a pan provided with a paper holder or clamp, a conveyer, and a presser connected with the box and acting to hold a paper sheet upon the pan, substantially as described.

In testimony whereof I have hereunto set my hand in the presence of two subscribing witnesses.

LOUIS G. FERRAIOLI.

Witnesses:
WM. C. HAUFF,
E. F. KASTENHUBER.